United States Patent
Schneider

[11] Patent Number: 5,821,300
[45] Date of Patent: Oct. 13, 1998

[54] PROCESS FOR PREPARING POLYMERIC BINDERS AND THEIR USE FOR ANTIFOULING PAINT SYSTEMS

[75] Inventor: Uwe Schneider, Dortmund, Germany

[73] Assignee: Witco GmbH, Bergkamen, Germany

[21] Appl. No.: 956,747

[22] Filed: Oct. 23, 1997

[51] Int. Cl.⁶ .................................................. C08F 230/04
[52] U.S. Cl. .......................... 524/807; 523/122; 526/240
[58] Field of Search ........................... 526/240; 523/122; 524/807

[56] References Cited

U.S. PATENT DOCUMENTS

| | | | |
|---|---|---|---|
| 3,466,366 | 9/1969 | Leebrick | 526/240 |
| 3,979,354 | 9/1976 | Dyckman et al. | 526/240 |
| 4,021,392 | 5/1977 | Milne et al. | |
| 4,107,174 | 8/1978 | Baumann et al. | 526/240 |
| 4,111,879 | 9/1978 | Mori et al. | |
| 4,318,730 | 3/1982 | Mori et al. | |
| 4,563,209 | 1/1986 | Mori et al. | |
| 4,761,439 | 8/1988 | Braeken et al. | |
| 4,769,398 | 9/1988 | Kanda et al. | |
| 4,962,135 | 10/1990 | Braeken et al. | |
| 5,288,409 | 2/1994 | Herrie et al. | |
| 5,318,814 | 6/1994 | Elliott et al. | |
| 5,637,745 | 6/1997 | Silverman et al. | 523/122 |

FOREIGN PATENT DOCUMENTS

| | | | |
|---|---|---|---|
| 34936/89 | 11/1989 | Australia . | |
| 279 258 | 5/1990 | Germany . | |
| 56-164106 | 12/1981 | Japan | 523/122 |
| 57-102966 | 6/1982 | Japan | 523/122 |
| 57-198762 | 12/1982 | Japan | 523/122 |
| 58-040374 | 3/1983 | Japan | 523/122 |
| 60-94472 | 5/1985 | Japan | 526/240 |
| 61-231061 | 10/1986 | Japan | 523/122 |
| 61-231062 | 10/1986 | Japan | 526/240 |
| 1 457 590 | 12/1976 | United Kingdom . | |
| 2 152 947 | 8/1985 | United Kingdom . | |
| WO 93/02146 | 2/1993 | WIPO | 523/122 |
| WO 94/17126 | 8/1994 | WIPO . | |

*Primary Examiner*—Veronica P. Hoke
*Attorney, Agent, or Firm*—Scully, Scott, Murphy & Presser

[57] ABSTRACT

The invention relates to binders for antifouling coating compositions, which are prepared by copolymerizing a mixture of polymerizable monomers comprising A) at least one of the compounds of the general formula I

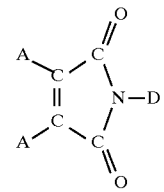

and B) at least one ethylenically unsaturated compound having the general formula II

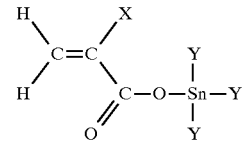

with optionally C) at least one ethylenically unsaturated compound, where the molar ratio of (A+B) to C is from 1:0 to 1:10, are polymers in the presence of a free-radical initiator and inert solvent.

8 Claims, No Drawings

PROCESS FOR PREPARING POLYMERIC BINDERS AND THEIR USE FOR ANTIFOULING PAINT SYSTEMS

FIELD OF THE INVENTION

The present invention relates to a process for preparing polymerizable, slowly hydrolyzable compounds which can be used to prepare underwater areas against infestation by marine organisms.

BACKGROUND OF THE INVENTION

Surfaces under continual exposure to sea water, for example ships, buoys, drilling platforms, underwater pipelines, fishing nets, etc., are, under appropriate conditions, colonized within a short time by marine organisms such as algae, seaweed, bivalves, tube worms, sponges, etc. This infestation is extremely disruptive in a large number of cases and is restrictive and a hindrance to the service properties of numerous facilities. For example, colonization of underwater ship areas leads to a restriction on the maneuverability of the ships and, because of the increased frictional resistance in the water, to a marked increase in fuel consumption.

For these reasons, infestation-preventing coating materials, known as antifouling paints, are employed widely for protecting underwater areas against colonization. These coating materials consist in most cases of a biocidal or nonbiocidal polymer and film-forming binder, co-biocides and pigments.

Frequently employed antifouling paints of recent years possess not only infestation-preventing but also self-polishing polymer film properties. In these systems the self-polishing effect is achieved by controlled hydrolysis of functional groups, leaving the surface of the coating hydrophilic and therefore erodable; coatings of this kind are described, for example, in EP-A-0 289 481. Antifouling paints which have found particularly broad use are those whose copolymers include triorganotin esters, especially tri-n-butyltin esters, of unsaturated carboxylic acids, for example (meth)acrylic acid. Examples of these are given in GB-A-1 457 590. Owing to the slow hydrolysis of the triorganotin ester group, these systems possess self-polishing properties coupled, through the biocidal action of the organotin compound, with-outstanding antifouling properties. This particularly favorable combination of properties has led to widespread use of tin-based antifouling paints.

In years gone by there has been discussion about the use of tributyltin-and triphenyltin-containing coating compositions, since the rates of release of the organotin compounds into the sea water that have been customary to date do not appear to be necessary in all regions. Thus in some countries the release rate of tin-containing antifouling paints has been restricted to 4 $\mu g\ cm^{-2}\ d^{-1}$ TBT (tributyltin) and they can only be used on ships with a length of more than 25 m. There is therefore a need for effective, slowly hydrolyzable antifouling paint systems which are of reduced tin content and yet have adequate self-polishing properties.

The literature describes various examples of tin-containing antifouling paints which in addition to an organotin-containing monomer also include various other functionalized monomers. Thus EP 0 342 493 cites copolymers of tributyltin methacrylate, acrylamide-and acrylic acid. Other systems are described in EP 0 200 433 (copolymers of tributyltin methacrylate, methyl methacrylate, styrene, ethylene to glycol dimethacrylate and acrylonitrile), AU 466 764 (copolymers of tributlytin acrylate and vinyl acetate) and DD 279 258 (copolymers of tributyltin acrylate) methyl methacrylate and polyethylene glycol monoacrylate). However, all of these systems have either found no widespread commercial use or do not have the particularly favorable combination of infestation-preventing and self-polishing properties.

WO 94/17126, U.S. Pat. No. 4,111,879 and U.S. Pat. No. 5,288,409 disclose that binders comprising N-substituted maleimides can have infestation-preventing properties. A disadvantage with the systems described, however, is that the N-substituted maleimides either can be mixed only physically into a binder, and in this way can be rapidly dissolved out in water, or are bound in a highly crosslinked polymer system, which on the other hand hinders controlled hydrolysis.

BRIEF SUMMARY OF THE INVENTION

It has now been found that polymers composed of a combination of organotin-containing (meth)acrylates—for example tributyltin methacrylate (TBTM)—and N-substituted maleimides show particularly favorable combinations of properties for use as an antifouling paint system. In these systems, the tin content of the polymers can be reduced to well below the commercially customary levels of about 20% by weight (or more) without losing the infestation-preventing and self-polishing properties. The reduced Ad- hydrolysis as a result of the lower content of organotin-containing monomers is compensated in these systems by the content of N-substituted maleimide monomers which undergo controlled hydrolysis, and which may have a complementary infestation-preventing property. This hydrolysis in an alkaline medium (sea water pH: 8.1–8.3) is a prerequisite firstly for self-polishing properties and secondly for an infestation-preventing effect of the paint by means of slow, continuous release of the hydrolyzed compounds. A particular advantage of the present invention is that the N-substituted maleimide monomers are chemically bonded in a linear polymer system with little branching or crosslinking and that the slow hydrolysis of the organotin and maleimide groups which this allows is able to produce partially hydrophilic and thus soluble polymer surfaces.

The present invention accordingly provides binders for antifouling coating compositions, preparable by copolymerization of polymerizable monomers, wherein the polymerizable monomers comprise mixtures of A) at least one compound of the general formula I

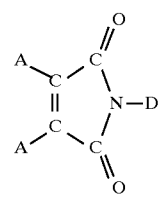

in which:

A=H, Cl, Br or F

D=Ph($R^1$)$_n$ or benzyl or —$CH_2$—$COOR^2$

Ph=phenyl $R^1$=identical or different in each occurrence and is —$NR^2{}_2$, —NH—CO—$R^2$, —NH—$COOR^2$, —$CH_2$—$COOR^2$, —$COOR^2$, —C(O)H, —O—$R^2$, —O—CO—$R^2$, —$SO_3H$, halogen, an unsubstituted or substituted thiazolylsulfamyl compounds of the formula

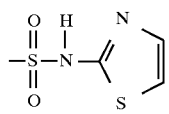

or an unsubstituted or substituted thiadiazolyl compound n=1–3

R² =identical or different in each occurrence and is H, or an unsubstituted or substituted alkyl, aryl, cycloalkyl or aralkyl radical having 1–10 carbon atoms and B) at least one ethylenically unsaturated compound having the general formula II

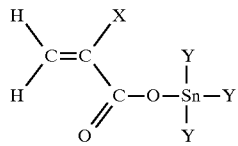

in which

X=H or CH₃

Y=$C_4$–$C_{12}$ alkyl, phenyl or cyclohexyl in which the molar ratio of A to B is from 1:1 to 5:1 and optionally C) at least one ethylenically unsaturated compound, the molar ratio of (A+B) to C being from 1:0 to 1:10, in the presence of one or more free-radical initiators and inert solvents in a manner known per se.

DETAILED DESCRIPTION OF THE INVENTION

The unsubstituted or substituted thiadiazolyl compounds ($R^1$ in formula I) can be 1,2,4-thiadiazoles, unsubstituted or substituted in position 3 by halogen, $C_1$–$C_4$ alkyl or aryl. The unsubstituted or substituted thiazolylsulfamyl compounds ($R^1$ in formula I) can, if substituted, be substituted by halogen or $C_1$–$C_4$ alkyl in position 4 and/or 5.

As component A for preparing binders for antifouling paints it is possible to use, for example, substituted N-(phenyl)maleimides, such as N-(4-formylphenyl) maleimide, N-(4-acetylaminophenyl)-maleimide, N-(4-phenyl acetic acid)maleimide, N-sulfathiazolyl)maleimide, N-(2-chlorophenyl)maleimide, N-(4-chlorophenyl) maleimide, N-(4-bromophenyl)maleimide, N-(4-fluorophenyl)maleimide, N-(2,3-dichlorophenyl)-maleimide, N-(2,4,6-trichlorophenyl) maleimide, N-2,4,6-tribromophenyl) maleimide, N-(4-methoxyphenyl) maliemide, N-(4-hydroxyphenyl)maleimide, N-(4-carboxyphenyl) maleimide, N-(4-sulfonic acid phenyl) maleimide, N-(4-acetoxyphenyl)maleimide, N-(3-ethyloxycarbonyl-phenyl) maleimide, N-(4-methyloxy carbonylphenyl)-maleimide, N-(4-ethyloxycarbonylphenyl) maleimide, N-[4-(N',N',dimethylamino)phenyl]maleimide; N-(glycinyl)maleimides, such as N-(glycinyl)maleimide, N-(ethylglycinyl)maleimide; N-substituted 2,3-dichloromaleimide, N-(4-chlorophenyl)-2,3-dichloromaleimide, N-(4-ethyloxycarbonyl-phenyl)-2,3-dichloromaleimide.

Particular preference is given to using N-(4-chlorophenyl) maleimide, N-(4-bromophenyl)maleimide, n-(4-fluorophenyl)maleimide, N-)2,4,6-trichlorophenyl) maleimide, N-(2,4,6-tribromphenyl)maleimide, N-(4-hydroxyphenyl)maleimide, N-(4-carboxyphenyl) maleimide, N-(4-acetoxyphenyl)maleimide, N-(4-ethoxycarbonylphenyl)maleimide, N-(4-sulfathiazolyl) maleimide, N-(benzyl)maleimide, N-(glycinyl)maleimide, N-(4-chlorophenyl)-2,3-dichloromaleimide, N-(4-ethyloxycarbonylphenyl)-2,3-dichloromaleimide, N-[4-(N', N'-dimethylamino)phenyl]maleimide.

As component B for preparing binders for antifouling paints it is possible to employ, for example, tin-containing monomers such as tributyltin methacrylate, trioctyltin methacrylate, triphenyltin methacrylate, tricyclohexyltin methacrylate, tributyltin acrylate, triphenyltin acrylate. Preference is given to employing tributyltin methacrylate.

The ethylenically unsaturated compounds C which can also be used in accordance with the invention include monomers such as:

1) carboxyl-containing compounds, for example acrylic acid, methacrylic acid, maleic acid, itaconic acid
2) $C_1$–$C_{18}$ esters of acrylic acid and methacrylic acid, for example methyl acrylate, ethyl acrylate, propyl acrylate, n-butyl acrylate, n-hexyl acrylate, methyl methacrylate, ethyl methacrylate, propyl acrylate, methyl methacrylate, ethyl methacrylate, propyl methacrylate, i-propyl methacrylate, n-butyl methacrylate, n-hexyl methacrylate or n-dodecyl methacrylate; $C_2$–$C_{18}$ alkoxy esters of acrylic acid and methacrylic acid, for example methoxyethyl acrylate, methoxyethyl methacrylate, methoxybutyl acrylate, methoxybutyl methacrylate, ethoxybutyl acrylate or ethoxybutyl methacrylate; $C_2$–$C_8$ hydroxyalkyl acrylates and hydroxyalkyl methacrylates, for example hydroxyethyl acrylate, hydroxypropyl methacrylate, hydroxypropyl acrylate or hydroxypropyl methacrylate; silicon-containing esters of acrylic acid and methacrylic acid, for example (3-methacryloyloxypropyl) triethoxysilane, trimethylsilyl methacrylate;
3) vinyl compounds, for example styrene, α-methylstyrene, vinyltoluene, p-chlorostyrene, vinyl acetate, 4-vinylpyridine or N-vinylpyrrolidone.

The antifouling binder systems are prepared by free-radical or ionic copolymerization of the monomers according to the invention with (if used) the ethylenically unsaturated compounds. As free-radical initiators it is possible to use conventional compounds containing peroxide or azo groups, such as dibenzoyl peroxide, bis(α,α-dimethylbenzyl) peroxide, tert-butyl hydroperoxide, potassium peroxodisulfate, 2,2'-azobisisobutyronitrile and 2,2'-azobis(2-methylbutyronitrile), in concentrations of from 0.01 to 2% by weight of the monomer mixture employed. The copolymerization is preferably conducted in appropriate solvents as a solution polymerization or precipitation polymerization. Solvents suitable for this purpose are aromatic and aliphatic hydrocarbons, such as toluene, xylene, hexane, heptane and petroleum spirit; esters, such as ethyl acetate and butyl acetate; ketones, such as acetone; ethers, such as ethylene glycol dimethyl ether, diethylene glycol dimethyl ether (diglyme), dibutyl ether, 1,4-dioxane, tetrahydrofuran and 1-methoxy-2-propanol, or solvents such as N,N-dimethyl formamide, dimethyl sulfoxide, N-methyl-pyrrolidin-2-one, water or butanol, possibly as a mixture. The monomer concentration depending on the desired viscosity is between 5 and 80% by weight, based on the overall solution. The copolymerization itself can be conducted by means of known techniques, for example by heating the monomers together with the initiators in the solvent or by dropwise addition of the monomers to heated solvent. Depending on the composition of the monomer mixture and on the chosen conditions of copolymerization, the copolymers obtained differ in composition and have number-average molecular weights of from 5000 to 200,000.

The antifouling binders prepared in this way can if desired comprise auxiliaries and additives, such as pigments, biocides and stabilizers, as are described in U.S. Pat. No. 5,332,430, in order to improve their properties. Examples of pigments are titanium dioxide, active charcoal, iron oxide and blue pigments, and examples of biocides are copper oxide, copper thiocyanate, zinc oxide, zinc pyrithione, zinc bis(dimethyldithiocarbamate) and also compounds which comprise, for example, benzothiazoles, dithiocarbamates, triazines, thiodiazines, thiadiazoles, isothiazolines, quaternary ammonium salts. Examples of other additives are fillers such as silicon dioxide, kaolin and talc and auxiliaries such as bentonites, Aerosil and similar compounds.

The present invention is described in more detail in the following examples.

EXAMPLES

Example 1

General synthesis procedure for preparing monomers

In a three-necked flask, 0.8 mol of maleic anhydride, 450 ml of N,N-dimethylformamide and 0.8 mol of the respective starting compound with a primary amine group were combined and the mixture was stirred at room temperature for 5 h. The reaction mixture was subsequently poured into 600 ml of cold water. The maleamic acid which precipitated was filtered off, washed with cold water and then dried in a drying oven. The maleamic acid was placed together with 300 ml of acetic anhydride and 8.2 of sodium acetate (anhydrous) in a three-necked flask. The mixture was stirred at 60° C. for 2 h. To isolate the substituted maleimide, the solution was poured slowly into cold water and the precipitated product was filtered off, washed with water and dried in a drying oven. The crude product was purified by recrystallization from methanol:water (6:1).

Example 2

General synthesis procedure for preparing monomers 1.0 mol of maleic anhydride in 50 ml of toluene were charged to a three-necked flask. 1.0 mol of the respective starting compound with a primary amine group in 150 ml of toluene was added slowly dropwise with stirring, and the mixture was stirred at room temperature for 30 minutes and then heated under reflux for a further 30 minutes. The precipitated maleamic acid was filtered off and dried. The maleamic acid was placed together with 500 ml of acetic anhydride and 35 g of sodium acetate (anhydrous) in a three-necked flask and the mixture was stirred at 70° C. for 2 h. To isolate the substituted maleimide, the solution was poured slowly into cold water and the precipitated product was filtered off, washed with water and dried in a drying oven. The crude product was purified by recrystallization from ethanol:water (6:1).

Example 3

General synthesis procedure for preparing monomers 0.5 mol of maleic anhydride was dissolved in 350 mol of xylene in a three-necked flask with thermometer, water separator, dropping funnel and stirrer. A solution of 0.5 mol of the respective starting compound with a primary amine group in 300 ml of xylene was added dropwise at room temperature. After the end of the addition the mixture was stirred at 65° for 2 h. 2 g of sulfuric acid were added, and the water formed during the reaction was distilled off with the aid of the water separator at a room temperature of 135°–140° C. for about 4 h. Then the xylene was distilled off and the reaction mixture was poured into 750 ml of cold water. The precipitated N-substituted maleimide was filtered off, washed with water and dried. The crude product was purified by recrystallization from ethanol:water (6:1).

TABLE 1

Synthesis of the monomers

| Product | Starting compounds [g] | Synthesis by Ex. No. | Yield [%] | Melting point |
| --- | --- | --- | --- | --- |
| N-(Benzyl)maleimide | Maleic anhydride (49.0)/ Benzylamine (53.6) | 3 | 72 | 69–70° C. |
| N-(4-Carboxyphenyl)maleimide | Maleic anhydride (68.7)/4-aminobenzoic acid (95.9) | 1 | 65 | 232–234° C. |
| N-(4-Acetoxyphenyl)maleimide | Maleic anhydride (75.0)/4-aminophenol (54.0) | 2 | 48 | 157–158° C. |
| N-(4-Bromophenyl)maleimide | Maleic anhydride (75.5)/4-bromoaniline (86.0) | 2 | 68 | 125° C. |
| N-(4-Chlorophenyl)maleimide | Maleic anhydride (98.0/4-chloroaniline (127.6) | 1 | 69 | 113–114° C. |
| N-(4-Fluorophenyl)maleimide | Maleic anhydride (19.6)/4-fluoroaniline (22.2) | 1 | 51 | 151–153° C. |
| N-(2,4,6-Tribromophenyl)maleimide | Maleic anhydride (10.8)/2,4,6-tribromoaniline (36.4) | 3 | 53 | 140–142° C. |
| N-(4-Ethyloxycarbonylphenyl maleimide | Maleic anhydride (98.2)/ethyl 4-aminobenzoate (165.2) | 2 | 65 | 111–113° C. |
| N-(Sulfathiazolyl)maleimide | Maleic anhydride (68.7)/sulfathizaole (178.7) | 1 | 78 | 168–175° C. |
| N-(4-Chlorophenyl)-2,3-dichloromaleimide | 2,3-Dichloromaleic anhydride (16.7)/4-chloroaniline (12.8) | 1 | 65 | 210° C. |
| N-(4-Ethyloxycarbonylphenyl)-2,3-dichloromaleimide | 2,3-Dichloromaleic anhydride (16.7)/ethyl 4-aminobenzoate (16.5) | 1 | 54 | 188–190° C. |
| N-(Glycinyl)maleimide | Maleic anhydride (41.9)/glycine (31.9) | 3 | 35 | 119° C. |
| N-(2,4,6-Trichlorophenyl)maleimide | Maleic anhydride (19.6)2,4,6-trichloroaniline (39.3) | 2 | 58 | 130–132° C. |

Example 4

General procedure for copolymerizing the monomers

The appropriate amount, depending on the desired copolymer composition, of component A (N-substituted maleimide), of component B (tin-containing comonomer) and of component C (comonomer) were placed together with the solvent and the initiator in a three-necked flask. To remove oxygen, the solution was stirred for 30 minutes under a constant stream of nitrogen. The mixture was then heated to 80° C. and copolymerization was carried out under these conditions for 4 h. The solids content of the solution was measured. The copolymer could be obtained in pure form by precipitation in methanol or petroleum ether and isolation in a customary manner (filtration).

TABLE 2

Copolymerizations

| No. | Monomer A | Monomer B | Monomer C | Solvent | Initiator (AIBN: Azobisiso-buryronitrile) | Tin content (based on the copolymer [% by wt.] | Solids content [% by wt.] |
|---|---|---|---|---|---|---|---|
| P1 | EPMI (49.0 g) | TBTM (75.0 g) | | Xylene (260.0 g) | AIBN (0.41 g) | 18.8 | 34.4 |
| P2 | EPMI (24.5 g) | TMTM (18.8 g) | | Xylene (102.0 g) | AIBN (0.14 g) | 12.7 | 30.6 |
| P3 | EPMI (49.0 g) | TMBM 75.0 g) | BMA (28.4) | Xylene (360.0 g) | AIBN (0.57 g) | 15.7 | 33.2 |
| P4 | EPMI (24.5 g) | TBTM (18.8 g) | DMA (12.7 g) | Xylene (132.0 g) | AIBN (0.18 g) | 10.8 | 28.6 |
| P5 | EPMI (12.3 g) | TBTM (18.8 g) | MEA (16.5 g) | Xylene (88.6 g) | AIBN (0.16 g) | 15.8 | 28.1 |
| P6 | BPMI (25.5 g) | TBTM (18.8 g) | | Xylene (103.6 g) | AIBN (0.14 g) | 14.5 | 25.4 |
| P7 | BPMI (100.8 g) | TBTM (75.0 g) | DMA (50.9 g) | Xylene (533.0 g) | AIBN (1.48 g) | 9.3 | 29.0 |
| P8 | CPMI (6.2 g) | TBTM (11.2 g) | DMA (76. g) | Xylene (59.2) | AIBN (0.09 g) | 13.6 | 27.1 |
| P9 | BMI (36.2 g) | TBTM (37.5 g) | | Xylene (172.2 g) | AIBN (0.34 g) | 16.0 | 29.8 |
| P10 | SMI (10.1 g) | TBTM (8.8 g) | DMA (7.6 g) | Xylene (67.4 g) | AIBN (0.99 g) | 12.3 | 29.9 |
| P11 | GMI (4.7 g) | TBTM (11.2 g) | MMA (3.0 g) | Xylene (44.1 g) | AIBN (0.99 g) | 18.3 | 20.3 |
| P12 | EPCMI (9.4 g) | TBTM (8.8 g) | Styrene (31. g) | Xylene (55.4 g) | AIBN (0.09 g) | 15.0 | 30.2 |
| P13 | FPMI (3.3 g) | TBTM (11.2 g) | | Xylene (52.3 g) | AIBN (0.09 g) | 16.9 | 27.8 |
| P14 | CBPMI (3.3 g) | TBTM (8.8 g) | BMA (4.3 g) | Xylene 43.9 g) | AIBN (0.09 g) | 18.5 | 20.5 |

| Abbreviation: | | | |
|---|---|---|---|
| EPMI | N-(4-Ethyloxycarbonylphenyl)maleimide | EPCMI | N-(4-Ethyloxycarbonylphenyl)-2,3-dichloro-maleimide |
| BPMI | N-(4-Bromophenyl)maleimide | FPMI | N-(4-Fluorophenyl)maleimide |
| CPMI | N-(4-Chlorophenyl)maleimide | TBTM | Tributyltin methacrylate |
| BMI | N-(Benzyl)maleimide | BMA | Butyl methacrylate |
| SMI | Sulfathiazolyl maleimide | DMA | n-Dodecyl methacrylate |
| GMI | N-(Glycinyl)maleimide | MEA | 2-Methoxyethyl acrylate |
| CBPMI | N-(4-Carboxyphenyl maleimide | MMA | Methyl methacrylate |

Determination of the degree of hydrolysis

To determine the degrees of hydrolysis of the binder systems according to the invention in an alkaline medium, measurement was made of the changes in conductivity and pH as a function of time. Direct measurement in sea water (pH: 8.1–8.3) was not possible for technical reasons (high intrinsic conductivity owing to the salt content).

The measurement was conducted as follows:

300 ml of double-distilled and degassed water were adjusted to a pH of 12 by adding NaOH platelets in a three-necked flask fitted with a stirrer, a pH electrode (WTW, type E50-1.5) and a conductivity electrode (WTW, type LTA 1, cell constant 0.996). The entire system was thermostatically controlled at 25°±0.1° C. (Haake Thermostat GH-D8). The meters employed were a pH meter (WTW, type pH 192) and a conductivity meter (WTW, type LF 530).

The monomeric compounds of Table 1 were introduced into the aqueous solution. In the case of the binder systems in solution according to Table 2, the solution was applied to glass beads with a diameter of 3 mm and the solvent was removed with the aid of a vacuum pump, in order to obtain film thickness conditions relevant to actual practice. The initial amount of the polymeric-binder system hydroxide of about 50% remained after theoretically complete hyrolysis.

To determine the degrees of hydrolysis, the coated glass beads were placed in the abovementioned solution. The changes in pH and conductivity as a function of time were measured directly in the solution, which was stirred for better mixing. The measurement period was 24 h.

The calculation of the degree of hydrolysis was based on the change in pH, which was reduced as a result of the hydrolysis of the corresponding functional groups (formation of carboxyl groups). By measuring the pH after 24 h (initial pH: 12.00) and calculating the number of functional groups (based on the initial amount) it was possible to determine the degree of hydrolysis (in%, based on the number of hydrolyzable functional groups).

Table 3 below shows clearly that the polymeric binder systems of the invention hydrolyzed in an alkaline medium under the chosen conditions. (Note: all monomers according to the invention of Table 1 possess degrees of hydrolysis>95%.)

TABLE 3

Hydrolysis of polymeric binder systems

| Binder System | Percentage of potentially hydrolyzable groups which are hydrolyzed within 24 h |
|---|---|
| P1 | 27.6% |
| P2 | 26.3% |
| P3 | 28.0% |
| P4 | 25.1% |
| P5 | 30.8% |
| P6 | 24.9% |
| P7 | 22.9% |
| P8 | 26.8% |
| P9 | 27.0% |
| P10 | 21.3% |
| P11 | 31.1% |
| P12 | 21.5% |
| P13 | 27.1% |
| P14 | 36.1% |
| Comparison Examples | |
| Poly(methyl methacrylate) | 3.0% |
| Poly[tributyltin methacrylate-stat-methyl methacrylate] (1:2, mol:mol) | 30.9% |

The effectiveness of the binder systems according to the invention against marine organisms was determined by exposure tests in the North Sea (Cuxhaven).

For this purpose, test plates made of polyvinyl chloride (10×15×0.4 cm) were provided with antifouling paints prepared in accordance with Example 5.

Example 5

General procedure for preparing antifouling coating compositions 75 g of the respective copolymer (e.g. P1–P14) as a 40–50% solution, 5 g of copper (I) oxide, 13 g of zinc oxide, 11.1 g of Bentone 38 (gelling agent based on montmorillonite earth, Titangesellschaft, 6% solution in xylene) and 10 g of xylene were milled intensively for one hour. This gave the antifouling paints 1 to 14 (Table 4).

After degreasing with solvents (e.g. acetone) the PVC plates were painted twice with the antifouling paint and dried at room temperature for 48 h. The dry film thickness was 80–120 μm. The coated PVC plates were then clamped in a plastic frame and stored permanently about 0.5–1.5 m below the surface of the water for a period of 12 months. Comparison data were obtained from untreated PVC plates, a test coating of poly[tributyltin methacrylate-stat-methyl methacrylate]{1:2, mol:mol; commercially used binder, tin content of the copolymer: 20.6% by weight}, a test coating of poly[tributyltin methacrylate-stat-methyl methacrylate] {1:3, mol:mol; reduced tin content of the copolymer: 17.6% by weight] and a tin-free test coating of polymethyl methacrylate as nonfunctionalized polymer component, which were prepared in accordance with Example 5.

Table 4 below shows clearly that the binders with reduced tin content and N-substituted maleimides, according to the invention, exhibit a biocidal activity against animal and vegetable infestation during the period of observation. The test coating poly[tributyltin methacrylate-stat-methyl methacrylate] {1:3, mol:mol}, with its reduced tin content and without the N-substituted maleimides according to the invention, in contrast, exhibited a markedly poorer antifouling effectiveness. The tin-free test plates without the compounds according to the invention showed almost complete infestation by algae, balanids and bivalves.

TABLE 4

Sea water storage of test plates in Cuxhaven

| Coating | 3 months | 6 months | 12 months |
|---|---|---|---|
| Antifouling paint 1 | 0 | 0 | 0 |
| Antifouling paint 2 | 0 | 0 | 0 |
| Antifouling paint 3 | 0 | 0 | 0 |
| Antifouling paint 4 | 0 | 0 | 0 |
| Antifouling paint 5 | 0 | 0 | 0 |
| Antifouling paint 6 | 0 | 0 | 0 |
| Antifouling paint 7 | 0 | 0 | 10 |
| Antifouling paint 8 | 0 | 0 | 0 |
| Antifouling paint 9 | 0 | 0 | 0 |
| Antifouling paint 10 | 0 | 0 | 10 |
| Antifouling paint 11 | 0 | 0 | 0 |
| Antifouling paint 12 | 0 | 0 | 5 |
| Antifouling paint 13 | 0 | 0 | 0 |
| Antifouling paint 14 | 0 | 0 | 0 |
| Comparison PVC | | | |
| Untreated PVC plate | 30 | 80 | 100 |
| PMMA coating | 20 | 80 | 100 |
| Poly[tributyltin methacrylate-stat-methyl methacrylate] (1:2, mol:mol) | 0 | 0 | 0 |
| Poly[tributyltin methacrylate-stat-methyl methacrylate] (1:3, mol:mol) | 0 | 20 | 60 |

What is claimed is:

1. A binder for antifouling coating compositions, which is prepared by copolymerizing a mixture of polymerizable monomers comprising, A) at least one of the compounds of the general formula I

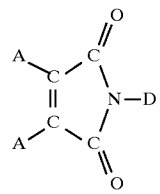

in which:

A H, Cl, Br, or F $D = Ph(R^1)_n$ or benzyl or $-CH_2-COOR^2$

Ph=phenyl $R^1$=identical or different in each occurrence and is $-NR^2_2$, $-NH-CO-R^2-NH-COOR^2$, $-CH_2-COOR^2$, $-C(O)H$, $-COOR^2$ $-O-R^2$, $O-CO-R^2$, $-SO_3H$, halogen, an unsubstituted or substituted thiazolylsulfamyl compound of the formula

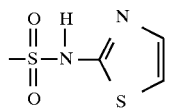

or an unsubstituted or substituted thiadiazolyl compound n=1–3

R$^2$=identical or different in each occurrence and is H, or an unsubstituted or substituted alkyl, alkyl, aryl, cycloalkyl or aralkyl radical having 1–10 carbon atoms and B) at least one ethylenically unsaturated compound having the general formula II

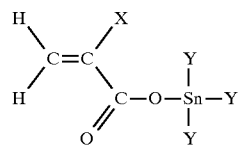

in which:

X=H or CH$_3$

Y=C$_4$–C$_{12}$ alkyl, phenyl or cyclohexyl in which the molar ratio of A to B is from 1:1 to 5:1 and optionally C) at least one ethylenically unsaturated compound, the molar ratio of (A+B) to C being from 1:0 to 1:10, in the presence of a free-radical initiator and inert solvent.

2. The binder as claimed in claim 1, wherein the ratio of A to B is from 1.5:1 to 3:1 and the ratio of (A+B) to C is between 1:0 and 1:5.

3. The binder as claimed in claim 1, wherein component A) is selected from the group consisting of N-(4-chlorophenyl)maleimide, N-(4-bromophenyl)-maleimide, N-(4-fluorophenyl)maleimide, N-(2,4,6-trichlorophenyl) maleimide, N-(4-acetoxyphenyl)-maleimide, N-(4-ethyloxycarbonylphenyl)maleimide, N-(sulfathiazolyl) maleimide, N-(benzyl)maleimide, N-(glycinyl)maleimide, N-(4-chlorophenyl)-2,3-dichloromaleimide, N-(4-ethyloxycarbonylphenyl)-2,3-dichloromaleimide, and N-[4-(N',N'-dimethylamino)-phenyl]maleimide; and component B) is tributyltin methacrylate; and component C) if present is selected from the group consisting of methacrylic acid, butyl acrylate, methyl methacrylate, butyl methacrylate, n-hexyl methacrylate, n-dodecyl methacrylate, 2-hydroxyethyl methacrylate, 2-methoxyethyl acrylate, 3-methacryloyloxypropyltrimethoxysilane, and mixtures thereof.

4. The binder as claimed in claim 3, wherein the ratio of A to B is from 1.5:1 to 3:1 and the ratio of (A+B) to C is between 1:0 and 1:5.

5. An antifouling coating composition comprising a binder in accordance with claim 1, and one or more auxiliary additives selected from pigments, antisettling agents, solvents, biocides and stabilizers.

6. An antifouling coating composition comprising a binder in accordance with claim 2, and one or more auxiliary additives selected from pigments, antisettling agents, solvents, biocides and stabilizers.

7. An antifouling coating composition comprising a binder in accordance with claim 3, and one or more auxiliary additives selected from pigments, antisettling agents, solvents, biocides and stabilizers.

8. An antifouling coating composition comprising a binder in accordance with claim 4, and one or more auxiliary additives selected from pigments, antisettling agents, solvents, biocides and stabilizers.

* * * * *

UNITED STATES PATENT AND TRADEMARK OFFICE
CERTIFICATE OF CORRECTION

PATENT NO. : 5,821,300
DATED : October 13, 1998
INVENTOR(S) : Uwe Schneider

It is certified that error appears in the above-identified patent and that said Letters Patent is hereby corrected as shown below:

On Title Page, Section [56], under "U.S. PATENT DOCUMENTS" line 1: "9/1969" should read --12/1969--

Column 1, line 45: "with-outstanding" should read --with outstanding--

Column 1, line 64: "acrylamide-and should read --acrylamide and--

Column 1, line 66: delete "to"

Column 2, line 28: delete "Ad-"

UNITED STATES PATENT AND TRADEMARK OFFICE
CERTIFICATE OF CORRECTION

PATENT NO. : 5,821,300
DATED : October 13, 1998
INVENTOR(S) : Uwe Schneider

It is certified that error appears in the above-identified patent and that said Letters Patent is hereby corrected as shown below:

Column 10, line 44, below Table 4 insert the following:

--Numerical data: % of the infested areas, relative to
the overall area
0= no infestation
100= complete infestation--

Signed and Sealed this

Twenty-eighth Day of December, 1999

Attest:

Q. TODD DICKINSON

Attesting Officer

Acting Commissioner of Patents and Trademarks